UNITED STATES PATENT OFFICE.

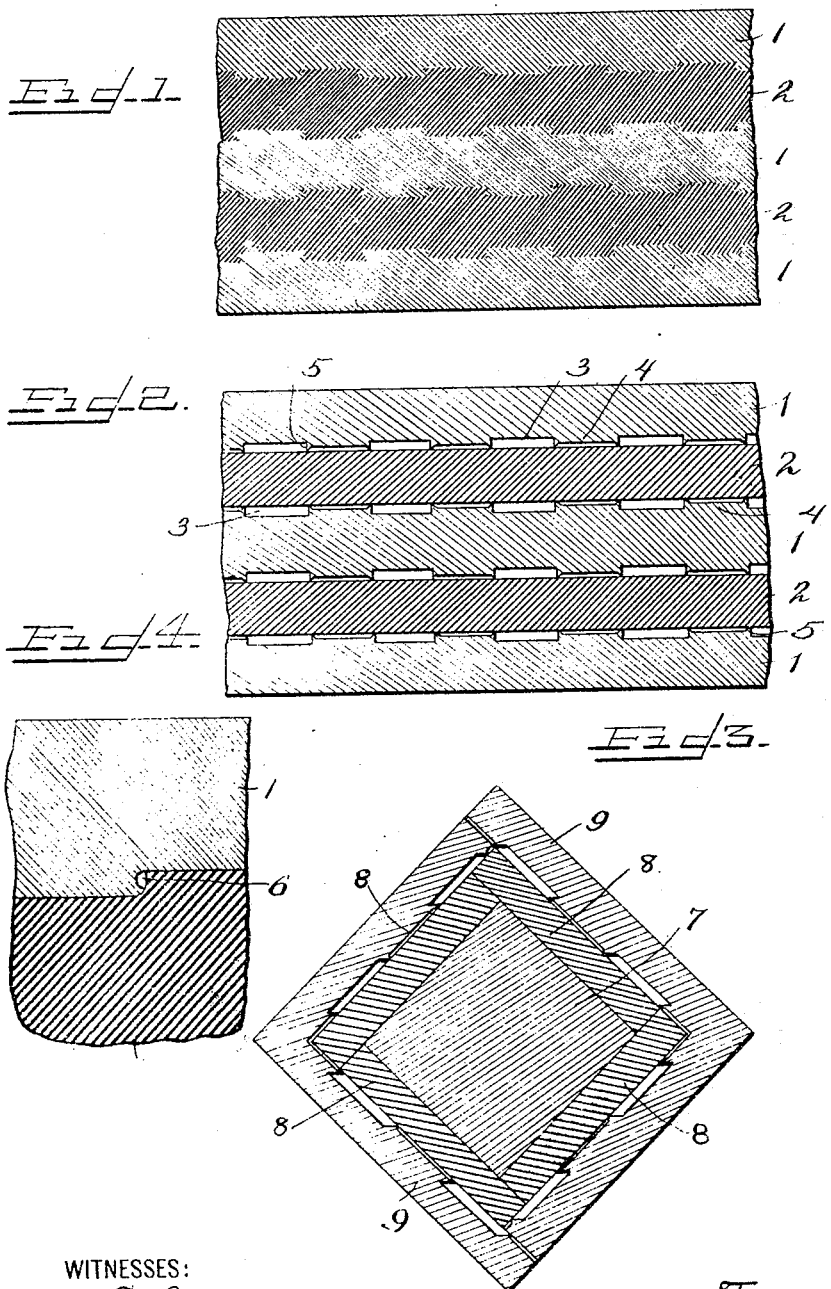

FERDINAND E. CANDA, OF NEW YORK, N. Y.

PROCESS OF WELDING.

SPECIFICATION forming part of Letters Patent No. 726,026, dated April 21, 1903.

Application filed May 19, 1902. Serial No. 108,101. (No specimens.)

*To all whom it may concern:*

Be it known that I, FERDINAND E. CANDA, a citizen of the United States, residing at New York, in the county of New York and State of New York, have invented certain new and useful Processes of Welding; and I do hereby declare the following to be a full, clear, and exact description of the invention, such as will enable others skilled in the art to which it appertains to make and use the same.

My invention relates to improvements in methods of welding steel plates and similar objects, and is especially applicable to the welding together of steel plates of different welding temperatures.

My invention consists in the novel manner whereby the adjacent surfaces of said plates or other objects are brought into intimate contact and mechanically interlocked and whereby the escape of the welding flux and of gas which may be between the plates is permitted and facilitated.

In the welding of steel plates and similar objects of large size much trouble has been experienced because of the failure to produce a perfect weld. It frequently happens that certain portions of the plates are welded together while other portions are not welded at all. This difficulty is encountered especially in the welding together of metals which have different welding temperatures—such, for example, as chrome-steel and ordinary mild steel or wrought-iron. In the making of safes, safety-deposit vaults, and the like compound plates are used which are composed of alternate layers of chrome-steel and wrought-iron or mild steel. In welding such plates together the plates of these different materials coated with a suitable welding flux are placed together in the desired order and heated to the welding-point. Chrome-steel reaches its welding-point quicker than ordinary wrought-iron or mild steel, the best welding temperature of the latter being much higher than the best welding temperature of the former, and if the heating be continued until the best welding temperature for wrought-iron or mild steel is reached the chrome-steel would be in a mushy condition. Therefore an intermediate temperature must be chosen. Furthermore, it is desirable that the plates when heated to the proper temperature shall be welded together between rolls or in a press rather than under the hammer, since hammer-welded plates are apt to be irregular in thickness.

Failure to secure proper welds between the plates may be due either to the collection of gas between the plates, to the incomplete removal of the oxid by the flux, or to insufficient surface contact between the plates.

In carrying out my process I form grooves or corrugations in the welding-surface of one of two objects to be welded together and also sometimes in the corresponding surface of the other object as well. When welding together plates of different welding temperatures the grooves or corrugations are preferably formed only in the plate having the highest welding temperature. Such grooves may be quite shallow, a thickness of from one-sixteenth to three thirty-seconds of an inch being sufficient. The grooving or corrugating may be done by passing the plates through suitably-formed rolls. Flux or other welding reagent is then applied to the plates in the ordinary manner, and they are then assembled and heated to the welding-point. When heated to the proper point, pressure is applied, as by a press or by means of rolls. This pressure forces out through the said grooves or channels the welding flux or a considerable part thereof, and also causes the metal opposite the grooves to flow into the same, so as to interlock the plates. It also causes the plates to weld together. The molten flux in flowing out from between the plates in effect washes their surfaces, carrying away particles of oxid or scale which otherwise might prevent the perfect welding of the plates.

The accompanying drawings illustrate the manner of carrying out my process.

Figure 1 shows a transverse section of a five-ply plate, the component layers of which have been welded in the manner above described, the wavy character of the lines of juncture being somewhat exaggerated. Fig. 2 shows a similar section of the plates as prepared for welding. Fig. 3 is a view similar to Fig. 2 of the component parts of bars, such as are commonly used for jail-bars, propared for welding. Fig. 4 is a detail view, on a larger scale than the preceding figures, showing two plates partly welded and showing one of the channels through which the flux may escape, as it exists during the first application of pressure.

In the drawings plates of different welding temperatures are shown. The plates 1 have a relatively high welding temperature and the plates 2 a lower welding temperature. The plates 1 may be supposed to be of wrought-iron or mild steel and plates 2 of chrome-steel. In the welding-surfaces of the plates 1 grooves 3 and ribs 4 have been formed. They may be formed most conveniently by rolling.

It is well known that when grooves are rolled in plates, as above described, the rolls raise or upset the metal slightly in the vicinity of the grooves, forming elevations 5. When the plates are placed together and are rolled or pressed, the first effect of the pressure is to turn these raised portions 5 over the metal of the plates 2, which at the time is softer because its welding-point is lower, at the same time flowing into the grooves 3 and interlocking with the portions 5, so as to lock the plates together mechanically. At first the grooves 3 form channels for the escape of the flux and of any gas which may be between the plates, and even when these grooves are nearly filled with the metal of the plates 2 crevices 6 will exist at the sides of said grooves, through which more of the flux may escape. The ribs 5 when turned over, as above described, tend to protect these crevices 6; but the continued application of pressure tends to close these crevices, so that in the resulting plate they are indistinguishable. After the welding is complete it is customary to reheat the plates and to roll or press them still further to reduce them to a predetermined thickness. This rolling or pressing of course spreads the fibers of the plate, so that in the finished plate the lines of welding are slightly wavy in character. The particular form of the lines depends upon the extent to which the plates have been rolled or pressed and is not necessarily of the precise form shown in Fig. 1.

The same process is applicable to the welding of many other objects. In Fig. 3 I have shown how composite bars may be welded. These bars may consist of a core 7, of wrought-iron or mild steel, around which are placed bars 8 of harder steel, the whole being inclosed by angles 9, of wrought-iron or mild steel, grooved as above described. When such bars are pressed or rolled, the effect is to press out the flux, to interlock the layers, and finally to weld them together. Final rolling may then reduce the rod to round form or to any other form which may be desired.

It is obvious that the process herein described is capable of many modifications and variations and that various forms of grooves may be employed. Therefore I do not limit myself to the particular details of carrying out the process herein described nor to the use of any particular form of groove or channel for conducting off the flux.

What I claim is—

1. The herein-described process of welding metal plates and the like, which consists in forming channels between the welding-surfaces of the objects to be welded, applying flux to such surfaces and placing them together and then heating the objects and applying pressure to weld them and to force the molten flux out through said channels.

2. The herein-described process of welding metal plates and the like, which consists in forming grooves or ribs in the welding-surface of one of the objects to be welded, applying flux to the welding surfaces and placing them together and then heating the objects and applying pressure to weld them and to force the molten flux out through said channels.

In testimony whereof I affix my signature in the presence of two witnesses.

FERDINAND E. CANDA.

Witnesses:
ALPHONSE KLOH,
H. M. MARBLE.